United States Patent
Diels et al.

(10) Patent No.: US 6,175,437 B1
(45) Date of Patent: Jan. 16, 2001

(54) APPARATUS AND METHOD FOR HIGH BANDWIDTH LASER-BASED DATA COMMUNICATION

(75) Inventors: Jean-Claude Diels, Albuquerque, NM (US); Ralph Bernstein, Los Altos; Karl Stahlkopf, San Francisco, both of CA (US)

(73) Assignees: Electric Power Research Institute, Inc., Palo Alto, CA (US); The University of New Mexico, Albuquerque, NM (US)

(*) Notice: Under 35 U.S.C. 154(b), the term of this patent shall be extended for 0 days.

(21) Appl. No.: 09/215,352

(22) Filed: Dec. 18, 1998

Related U.S. Application Data

(60) Provisional application No. 60/068,184, filed on Dec. 19, 1997.

(51) Int. Cl.[7] .................................................. H04B 10/04
(52) U.S. Cl. .................... 359/180; 359/181; 359/183; 359/188; 359/158; 359/193
(58) Field of Search .................................. 359/180, 181, 359/183, 188, 193, 158

(56) References Cited

U.S. PATENT DOCUMENTS

| | | | |
|---|---|---|---|
| 3,675,039 | * 7/1972 | Boyd et al. | 307/88.3 |
| 4,746,193 | * 5/1988 | Heritage et al. | 350/162.12 |
| 4,866,699 | * 9/1989 | Brackett et al. | 370/3 |
| 5,526,171 | * 6/1996 | Warren | 359/285 |
| 5,623,359 | * 4/1997 | Giles et al. | 359/180 |
| 5,689,361 | * 11/1997 | Damen et al. | 359/284 |
| 5,841,563 | * 11/1998 | Effenberger | 359/158 |
| 5,867,290 | * 2/1999 | Dutt et al. | 359/115 |
| 5,907,421 | * 5/1999 | Warren et al. | 359/180 |

\* cited by examiner

*Primary Examiner*—Leslie Pascal
*Assistant Examiner*—Hanh Phan
(74) *Attorney, Agent, or Firm*—William S. Galliani; Pennie & Edmonds LLP

(57) ABSTRACT

A laser communication system includes a first laser to generate a laser signal with femtosecond pulses. A first grating spectrally disperses the femtosecond pulses of the laser signal. A modulator converts the femtosecond pulses of the laser signal into coded words. A second grating spectrally recombines the coded words of the laser signal. A first telescope launches the laser signal. A second telescope receives the laser signal. A second laser generates a set of reference pulses. A non-linear crystal combines the set of reference pulses and the laser signal so as to create an output signal only when the laser signal and the reference pulses temporally coincide. A detector records the output.

20 Claims, 14 Drawing Sheets

APPARATUS AND METHOD FOR HIGH BANDWIDTH LASER-BASED DATA COMMUNICATION

This invention claims priority to the provisional patent application entitled, "Apparatus and Method for Line of Sight Laser Communications", Ser. No. 60/068,184, filed Dec. 19, 1997.

BRIEF DESCRIPTION OF THE INVNETION

This invention relates generally to data communications. More particularly, this invention relates to a technique for high bandwidth laser-based data communications.

BACKGROUND OF THE INVENTION

Solid state fiber lasers have been developed for commercial communication applications. Picosecond pulses (ca 50 ps) are currently being used for fiberoptic based long distance (transpacific) soliton communication. Much shorter pulses (<100 Fs) have been generated with fiber sources, pumped by diode lasers. Such systems have the advantages that they are being tailored for communications, the bandwidth that is used is at an "eye safe" wavelength, and fast modulation techniques have been or are being developed. There is still work to be done, but the fact that the light is confined to a narrow waveguide helps improve the speed of modulation. The disadvantages of such systems is that they have a lossy transition from fiber to air, they have a larger diffraction angle at longer wavelengths, the minimum size beam at 20 km is about 10 m, there is a low average and peak power (pJ/pulse), and a low repetition rate (1 to 10 MHz) exists.

Solid state Nd vanadate lasers (Nd:YVO_4) could also be used in communication systems. These diode pumped lasers produce a train of pulses of about 5 ps duration (which could be compressed externally to the laser to 100 fs). The repetition rate is typically 100 MHz. The advantage of systems of this type are high efficiency, high average power-up to 100 W in an infrared beam, 20 W in the green, which can be frequency-tripled to a wavelength of 355 nm. The typical pulse energy in the green is 0.2 uJ/pulse. Pump diodes for this type of laser have a long lifetime; they are actively under development and they are relatively cost effective. In addition, these systems can provide diffraction limited beams in the green and UV. For the green, the minimum spot size at 20 km is about 2 m. For the UV, the minimum spot size at 20 km is about 1.5 m.

Solid state Cr:LiSAF Lasers (also Cr:LiSGAF and Cr:LiCAF) are another option for communication systems. Tunable pulse generation in the range of 820 nm to 880 nm has been demonstrated. Pulse duration as short as 20 fs has been obtained, but at very low average power. A maximum average power has been demonstrated at 1.1 W, for continuous operation, while short pulse operation is only 0.5 W. Advantageously, these systems have shorter pulses directly out of the laser, without compression. In addition, they have a shorter wavelength. The disadvantages of these systems is that they have less efficient pump diodes and less average power.

Existing laser-based communication systems rely upon light modulation through electronic control techniques. Thus, the speeds of such systems are inherently limited to the speeds of the electronic control systems. It would be highly desirable to to eliminate the speed limitation of electronic control systems. In particular, it would be highly advantageous to substitute an electronic control system with an optical control system to enhance the performance of a laser-based communication system.

Existing laser-based communication systems use fiber optic channels to communicate information. It would be desirable to reduce the expense and complexity of a laser-based communication system by eliminating the fiber optic channel. The absence of a fiber optic channel would allow more flexibility in developing communication system infrastructures.

SUMMARY OF THE INVENTION

A laser communication system includes a first laser to generate a laser signal with femtosecond pulses. A first grating spectrally disperses the femtosecond pulses of the laser signal. A modulator converts the femtosecond pulses of the laser signal into a string of pulses representative of coded words. A second grating spectrally recombines the coded words of the laser signal. A first telescope launches the laser signal. A second telescope receives the laser signal. A second laser generates a set of reference pulses. A non-linear crystal combines the set of reference pulses and the laser signal so as to create an output signal only when the laser signal and the reference pulses temporally coincide. A detector senses and records the output. The first laser also generates a synchronization signal. The second laser is synchronized by the synchronization signal.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
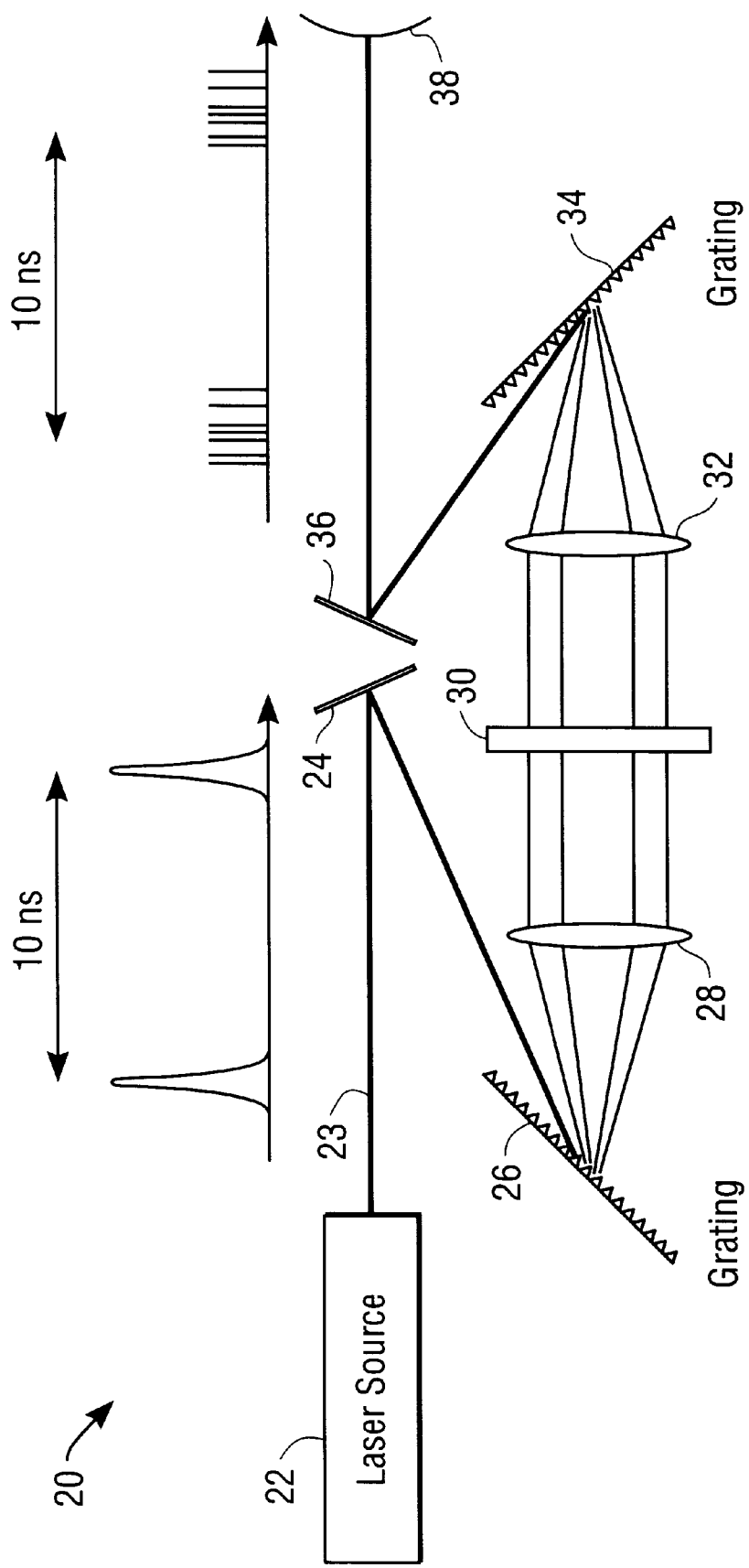
FIG. 1 illustrates a laser communication emitter in accordance with an embodiment of the present invention.

FIG. 1 illustrates a laser communication emitter 20 constructed in accordance with an embodiment of the invention. The apparatus 20 includes a laser source 22 that emits a laser beam 23 as a train of femtosecond ($1\times10^{-15}$ sec) pulses at a rate of 100 MHz (10 ns between pulses). The pulses are redirected by a mirror 24 and then spectrally dispersed by a first grating 26. Preferably, the mirror 24 is implemented in the form of an "echelon reflector", which consists of a "staircase" of mirrors. At each successive level, the reflecting surface is receded, giving the corresponding part of the beam a different delay. The mirror displacement should be equal to the delay between each channel times the speed of light. For an inter-channel delay of 10 ps, this corresponds to 3 mm. At each level, the beam is sent to a grating, which separates the various spectral components in the plane of the figure.

The spectral components then pass through a lens 28 and enter a modulator 30, which converts the pulses into "words" or coded sequence of pulses. The pulses are routed through a lens 32 and are then spectrally recombined by a second grating 34 before being reflected through a mirror 36 and being launched by a telescope 38. A synchronization beam (not shown) from the same laser source 22 is simultaneously sent through the telescope 38.

Systems similar to the system of FIG. 1 are known in the art. However, such prior art systems do not utilize a laser source 22 with femtosecond pulses and they do not utilize the modulator 30 of the invention, which is discussed in detail below. Thus, the prior art systems that otherwise appear to be similar, do not achieve the high bandwidth and other advantages associated with the present invention.

Figure 2:
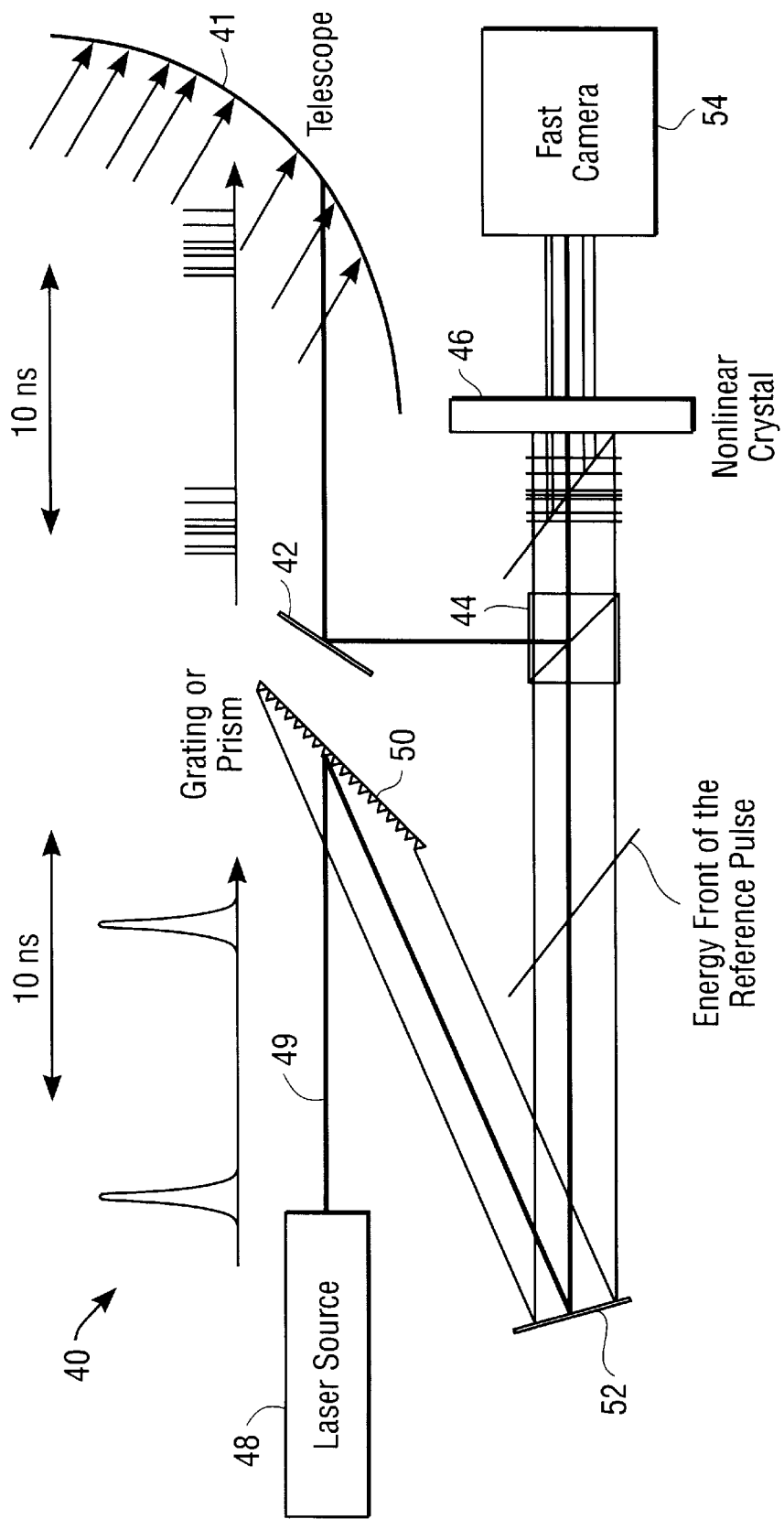
FIG. 2 illustrates a laser communication receiver in accordance with an embodiment of the present invention.

FIG. 2 illustrates a laser communication receiver 40 constructed in accordance with an embodiment of the invention. The apparatus 40 includes a receiving telescope 41 to receive the laser signal from emitter 20. The input signal is reflected with a mirror 42 into a polarizing beam splitter 44. The signal is then routed to a non-linear crystal 46, where it is combined with a signal from laser 48. Laser 48 applies a laser beam 49 to grating 50. The signal is then reflected by mirror 52 into the non-linear crystal 46. The signal from the laser 48 is a set of pulses that operate at the same repetition rate as the input signal from the telescope 41. The grating 50 or prisms are used to spatially delay the reference pulses from the reference laser 48. The non-linear crystal 46 only generates light when the reference light and the signal temporally coincide. Since the time of arrival of the reference light is "sloped" in the plane of the figure, the temporal sequence of the signal is transformed in a transverse pattern recorded by a fast camera or imaging array 54.

Thus, the invention provides femtosecond laser technology for very high speed and secure point-to-point communications. The technique of the invention provides more than a magnitude greater bandwidth than existing point-to-point communications technologies. This performance improvement is largely attributable to the fact that the control of the laser signal is achieved through optical means, not electronic means. The optical-based modulator of the invention facilitates a large increase in processing speed over prior art systems.

An array of microlenses may be used to focus portions of the beam into micro-electro-optic modulators, then back to microlenses and the main beam. The "length" of the word that can be carried at every period is determined by the spectral resolution of the system. The word is refreshed every period (10 ns). An alternative approach is to use successive periods for multiplexing.

The most obvious method of detection is to repeat at the receiving end what is being done at the emitter. If amplitude modulation is used, it is sufficient to display and read the spectrum of each word. It is also necessary to use single shot cross-correlations to isolate every 50 ps pulse sequence that is to be read. The detection end requires a similar source as the emitter, which is synchronized with the emitter.

To perform the synchronization, some signal is required to identify the beginning of each "word". If the basic period is the pulse repetition rate of 100 MHz, the infrared pulse may be used for synchronization, and the visible and UV pulses may be used for the signal to be transmitted.

There are a number of benefits associated with the invention. First, the invention provides a method of creating any wireless optical (laser) based communications link, using pulse code modulation with trains of femtosecond pulses unaffected by atmospheric diffraction (such as line-of-sight).

The invention is also advantageous because it uses optical amplifiers as repeaters. The invention can be advantageously used along (above and below ground) the rights-of-way currently managed and/or owned by the utilities around the world. For example, laser signals may be passed through underground ducts or between powerline transmission towers. The communications bandwidth, limited only by the bandwidth of the laser and the femtosecond pulses, is several orders of magnitude greater bandwidth than conventional microwave communications systems.

The laser communications systems are extremely secure, virtually impossible to "tap" into because of the unique nature of the laser signal and the narrowness of the laser beam. The laser system can be made inherently safe. When the emitter pulses are interrupted by any obstacle, the system is preferably designed to shut down.

The invention and its benefits have now been fully described. Attention presently turns to a more detailed discussion of various components of the invention. Pulses transmitted from the laser 22 are shaped by the modulator 30 of the invention. The modulator 30 may be configured to perform amplitude modulation or phase modulation. In the case of amplitude modulation, information is sent as a set of dark-bright lines imposed on the pulse spectrum. Preferably, the voltage to drive the modulator does not exceed 5V (TTL standard pulse). The modulator preferably responds in less than 10 ns (the time between successive pulses of the main train). Modulators are positioned to form a three dimensional stack. Each successive plane corresponds to one of the channels to be multiplexed.

Figure 3:
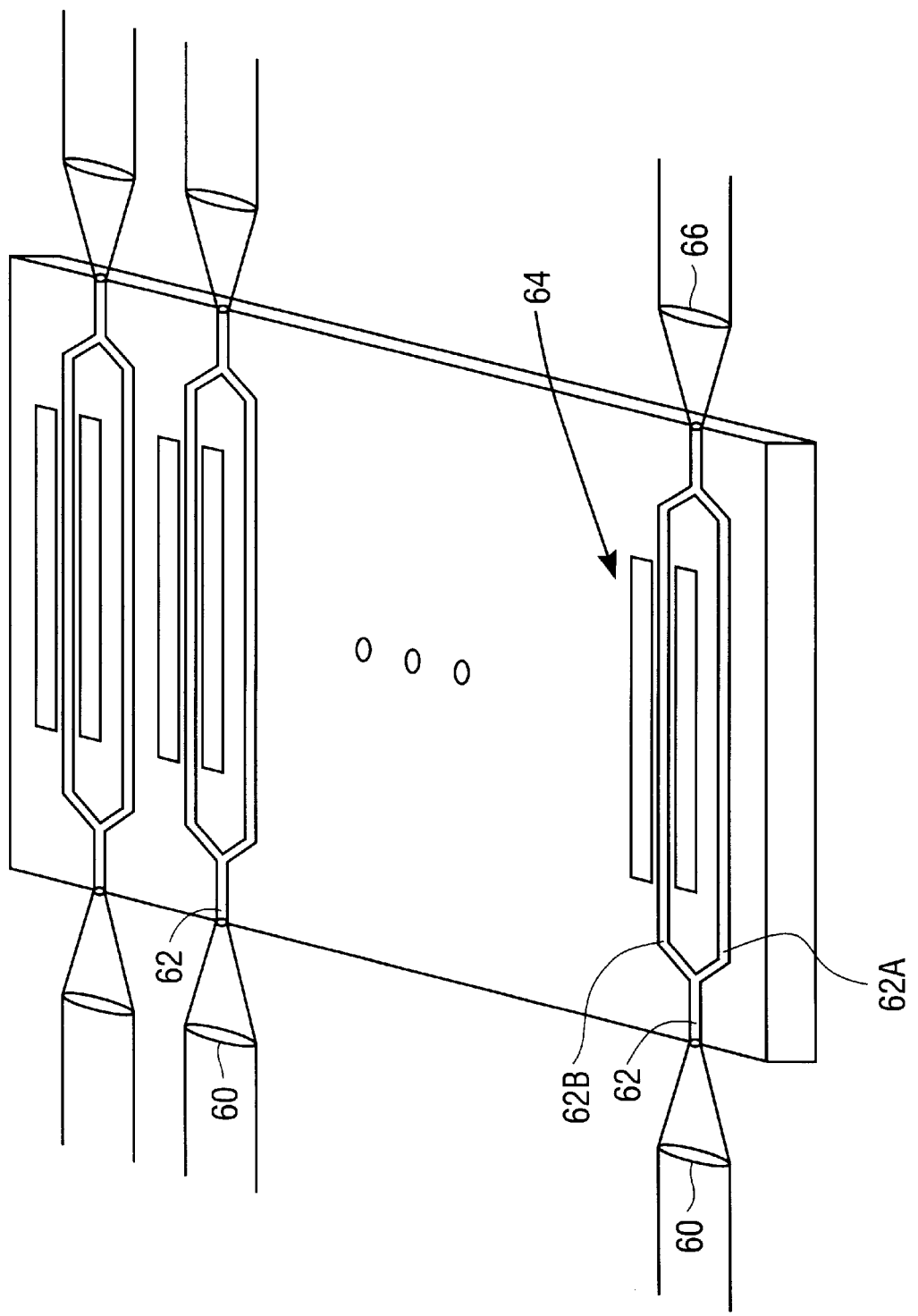
FIG. 3 illustrates an apparatus to perform amplitude modulation in accordance with an embodiment of the invention.

An array of Mach Zehnder modulators may be used to establish amplitude modulation in accordance with the invention. A Mach Zehnder modulator array in accordance with the invention is shown in FIG. 3. Fresnel lenses 60 are used to receive each spectral component and focus each component onto an optical waveguide 62. The waveguide 62 is split into two equal arms 62A and 62B. One arm (e.g., 62B) is surrounded by electrodes 64. If an electric field is applied to one of the arms of the Mach Zehnder interferometer using the electrodes 64, the radiation from the two arms interfere destructively. The two arms of the waveguide 62A and 62B converge into a single waveguide, forming a Mach Zehnder interferometer. Lenses 66 are used to focus the output light from the interferometer. Using state of the art lithographic techniques, the Fresnel lenses can be manufactured directly on the edge of the crystal (e.g., $LiNbO_3$) used as a modulator. This eliminates the need for complex alignment systems, and makes it possible to stack modulators on top of one another.

Figure 4:
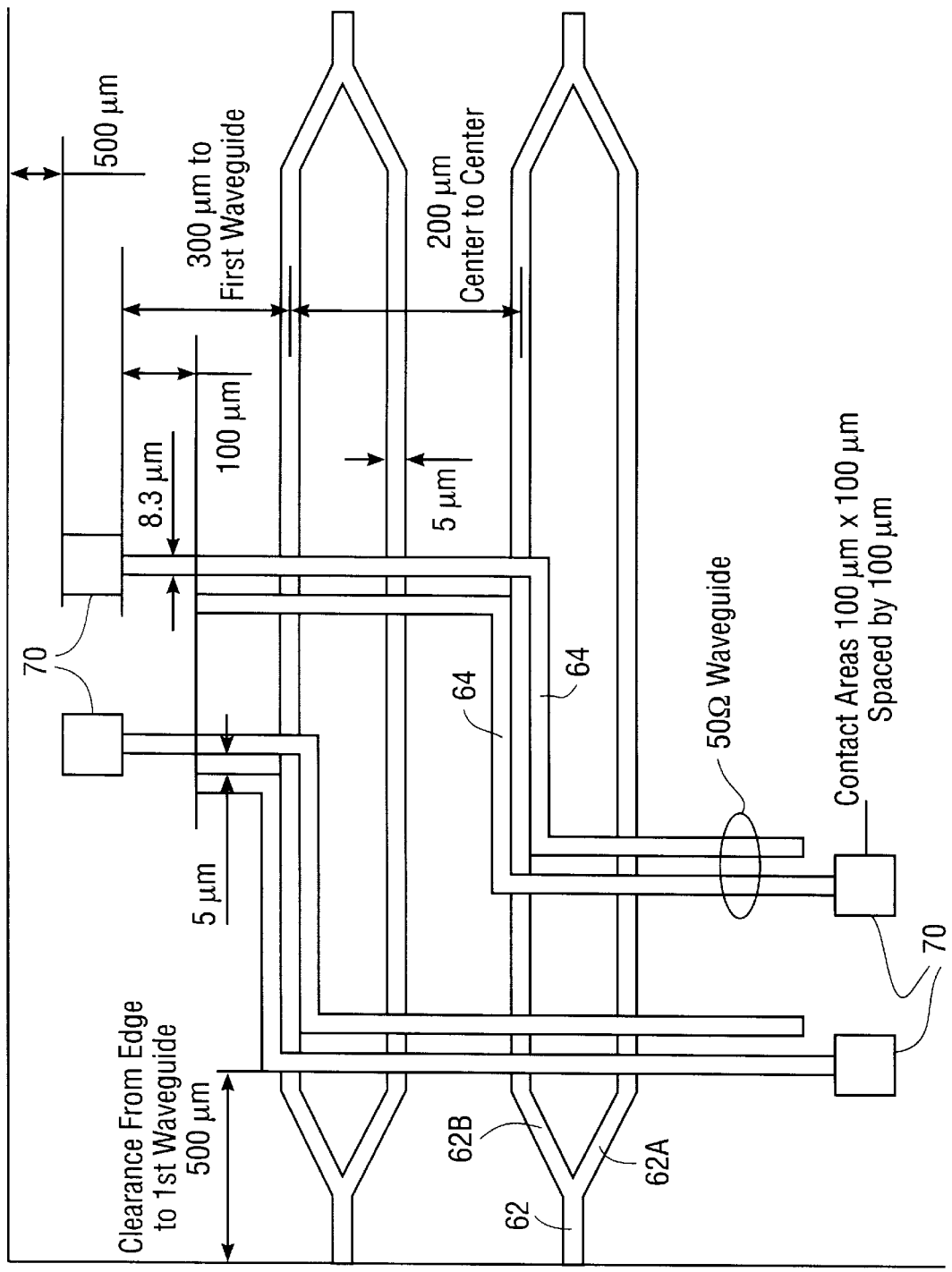
FIG. 4 is a more detailed illustration of selected components of the apparatus of FIG. 3.

FIG. 4 is a more detailed sketch of the device of FIG. 3 with accompanying dimensions. Contact pods 70 are located at the sides of the sample. The ratio of the waveguide width to the spacing is chosen for 50 Ohm impedance of the electrical waveguide. Rather than connecting on one end all electrodes to a common ground, each is individually connected to a bias control in order to adjust each waveguide for maximum transmission in the absence of a pulsed signal.

The optical waveguide of FIG. 4 is 5 microns wide and approximately 3 microns deep. The portion of the waveguide between electrodes is chosen for a π phase shift, for a TTL pulse. FIG. 4 is not to scale and therefore does not give a sense of the proportions of the device.

Figure 5:
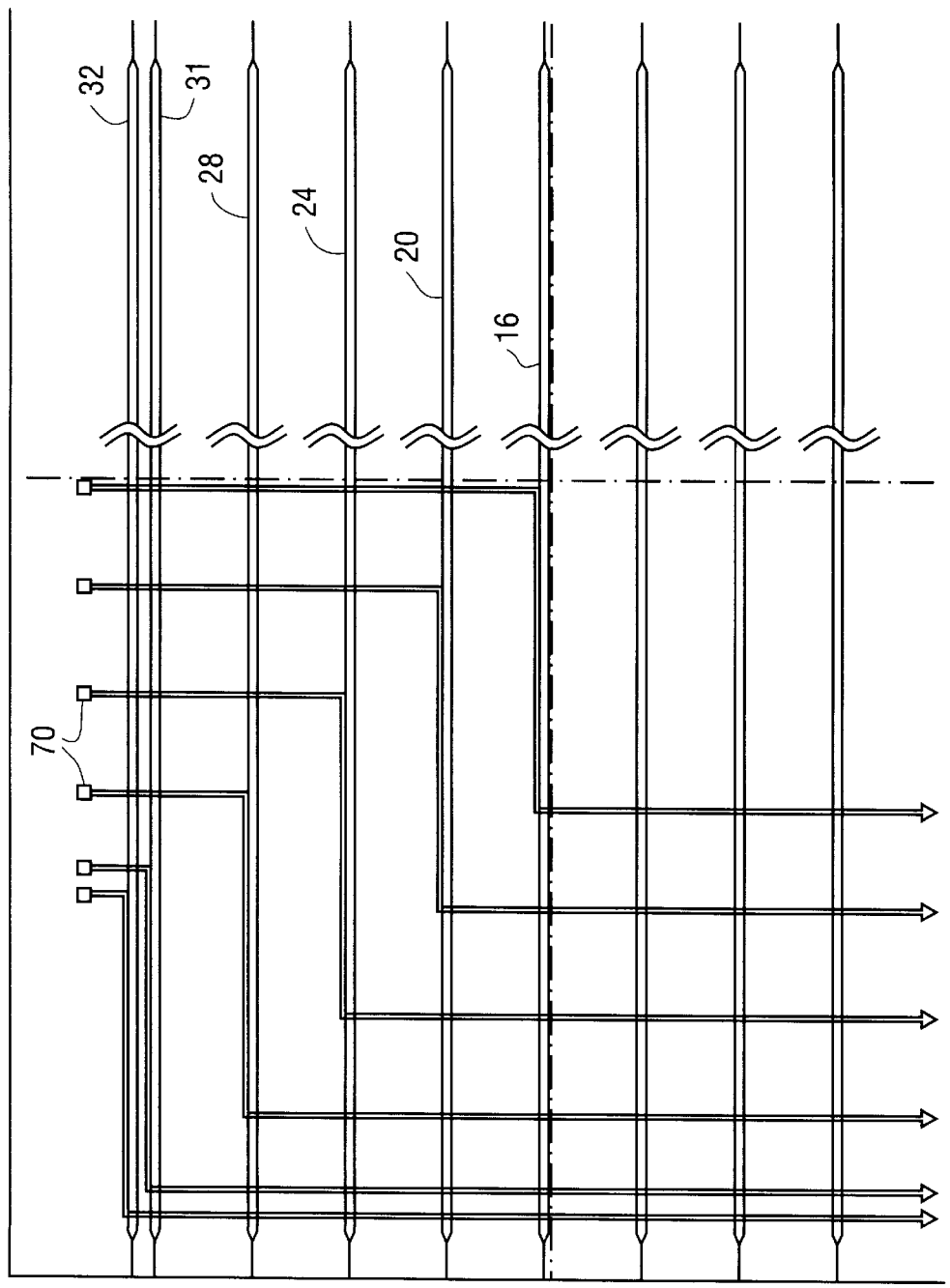
FIG. 5 is a more detailed illustration, drawn to scale, of selected components of the apparatus of FIG. 3.

FIG. 5 more accurately represents the scale of the device. As with FIG. 4, only a few of the waveguides are represented in FIG. 5. The last two waveguides (32 and 31) are shown in FIG. 5. Thereafter, only every fourth waveguide is shown. One series (low side) of electrodes connect to contact pods 70 at the upper edge of the sample. The corresponding high side of the electrodes connects to contact pods 70 at the lower edge (not shown). The median in both directions is indicated by a dot-dashed line. Microlenses can be made by lithography on the entrance and exit edges of the crystal, with the optic axis of the lens along the waveguide.

An amplitude modulation device to implement the modulator 30 has now been described in connection with FIGS. 3–5. Attention now turns to a phase modulation device that may be used to implement the modulator 30. In the case of phase modulation, the information is sent as a set of phase shifts imposed on each spectral component.

Figure 6:
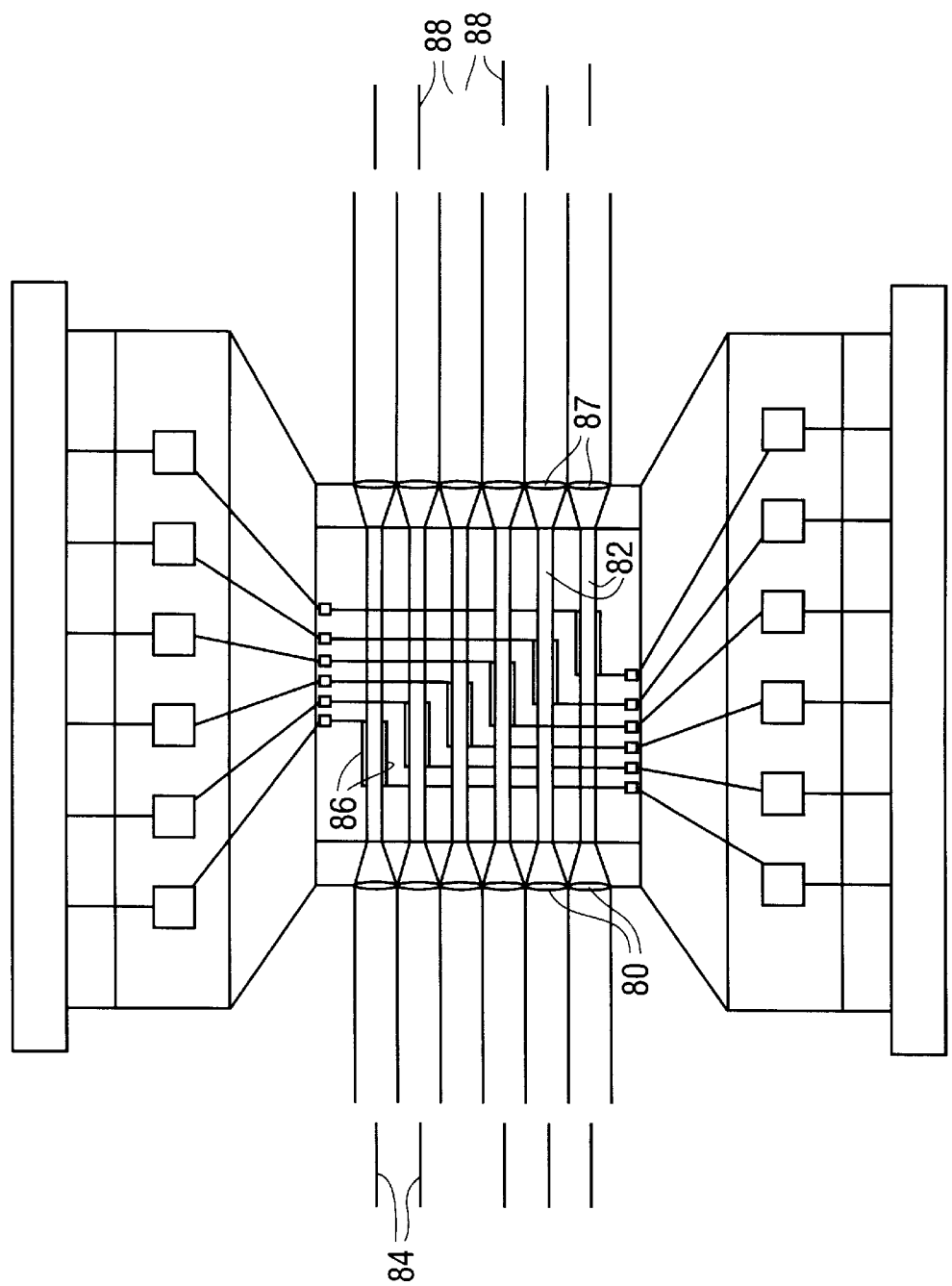
FIG. 6 illustrates a one-dimensional phase modulator array in accordance with an embodiment of the invention.

A phase modulator that may be used in accordance with the invention is shown in FIG. 6. Once again, an array of microlenses 80 is used to launch the light into an array of waveguides 82. The microlenses 80 may be positioned on the same substrate as the waveguides 82. The waveguides are formed of lithium niobate. Each entering spectral component is represented by lines 84. Depending on the voltage applied to the electrode 86 on the waveguide on which the light is launched, the corresponding radiation may be shifted in phase. Phase shifted spectral components at the output side of lenses 87 are shown with lines 88.

Figure 7:
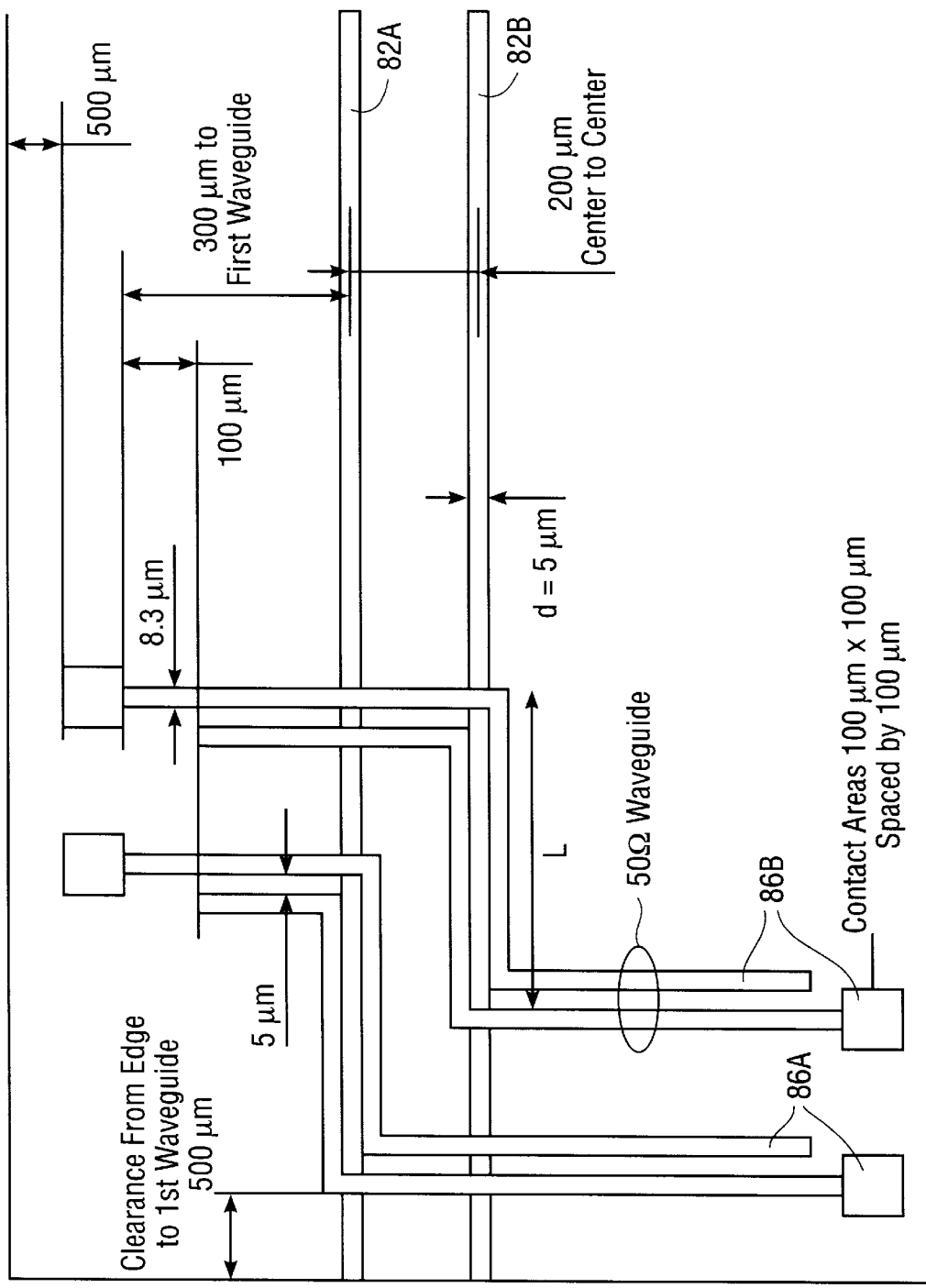
FIG. 7 is a more detailed illustration of the apparatus of FIG. 6.

Details of the design of the 1-dimensional array of phase modulators in $LiNbO_3$ are shown in FIG. 7. Thirty-two channels (waveguides separated by 150 microns) are designed on a 1×1 $cm^2$ substrate. In the case of a pulse of 100 fs (10 nm bandwidth) pulses at 100 Mhz centered around 800 nm result in a bandwidth per channel of(10/64)= 0.15 nm.

Two of the 32 waveguides are shown in FIG. 7 as 82A and 82B. The width and spacing (d) of each electrode pair 86 is chosen to correspond to a 50 Ohm transmission line. The length L of the electrode is such as to induce a π phase shift on the waveguide upon application of 5 Volts.

Figure 8:
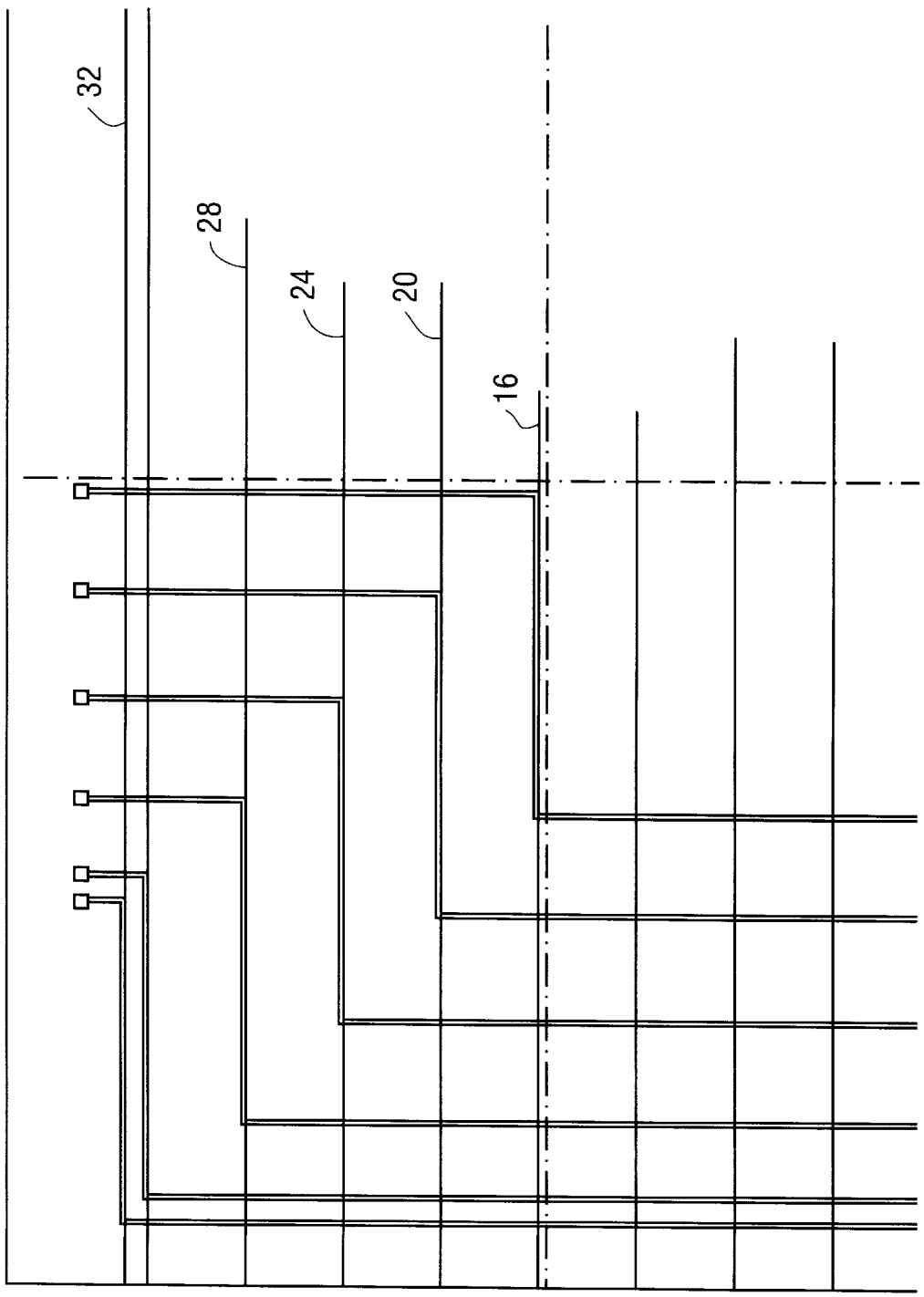
FIG. 8 is a more detailed illustration, drawn to scale, of selected components of the apparatus of FIG. 6.

Design considerations for the waveguide include a single mode, polarization preserving device and optimized fabrication parameters. The electrode design considerations include consideration of the length of the electrodes "L" and the separation "d" for 0-π phase change (0–10 Volts). Preferably, the leads are sufficiently separated from the pads to avoid crosstalk. A scaled sketch of the electrode design is shown in FIG. 8.

As in the case of the amplitude modulator, light has to be launched simultaneously in all waveguides, which requires a very accurate microlens array design, and also extremely accurate positioning. Positioning may be achieved by piezoelectric micromanipulators. These can be avoided if microlenses are made directly on the edge of the crystal. That is, the microlenses may be fabricated on the same substrate as the interferometers.

The foregoing discussion related to individual components of the system of FIG. 1. Attention presently turns to individual components of the system of FIG. 2. In particular, attention turns to different techniques for detecting the laser signals sent from the system of FIG. 1.

Figure 9:
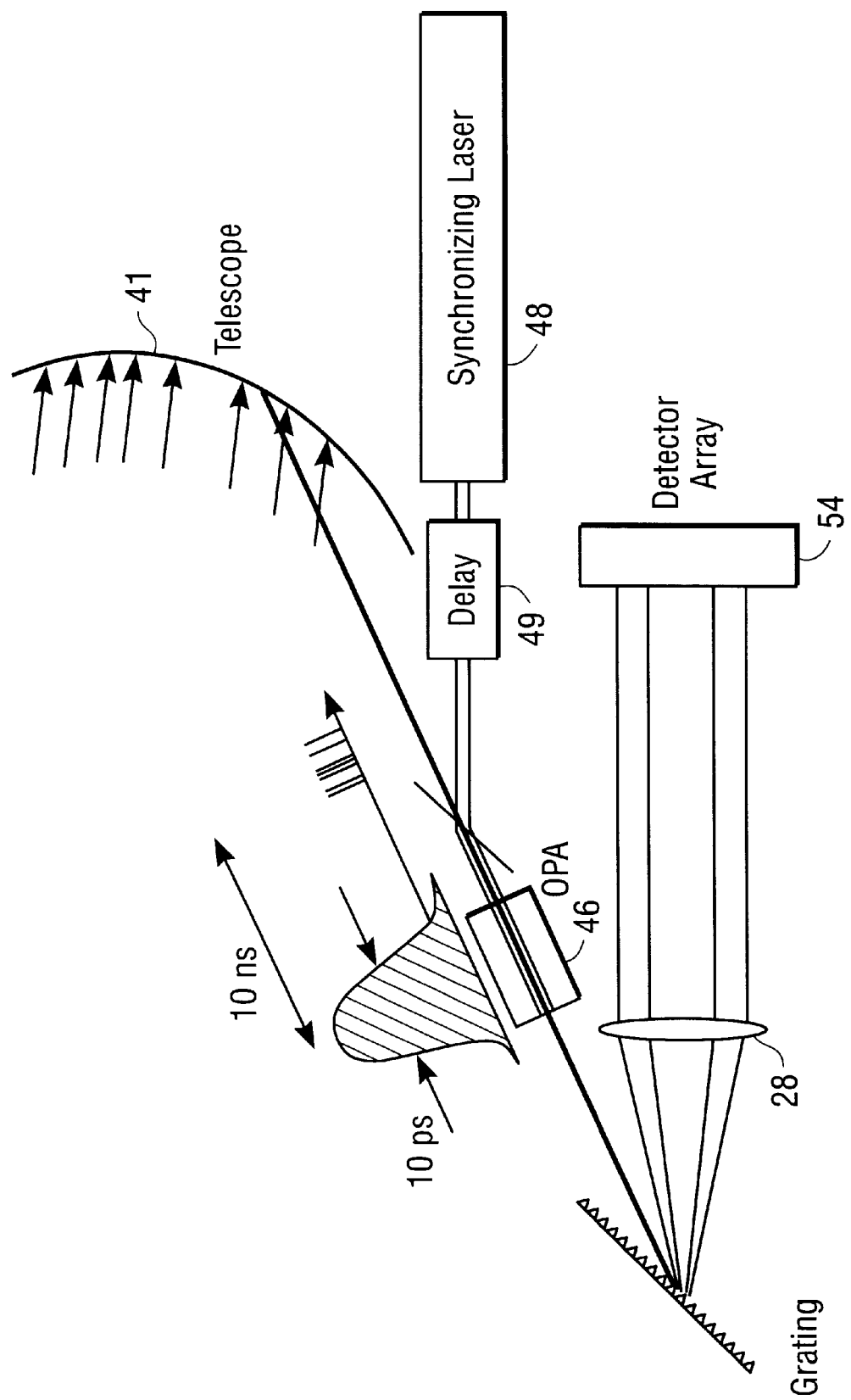
FIG. 9 illustrates an apparatus for detecting an amplitude modulated signal at a remote destination.

The detection of the amplitude modulated signal is the simplest, because it amounts to measuring the spectrum of the light, as gated by a 10 ps pulse to select the appropriate channel. One approach is depicted in FIG. 9, where parametric gain is used to simultaneously amplify the signal to be detected, and select the appropriate channel. The laser used at the reception for this particular amplitude modulation detection is emitting a synchronized train of 10 ps pulses at a wavelength shorter than that of the signal, and at the repetition rate corresponding to that of the emission (the period of emission of each channel). The method of synchronization can simply be injection mode-locking—the emitter is made to send a strong pulse at that particular wavelength. A very weak signal is needed to force another laser to operate synchronously, and at the same wavelength (injection mode locking). The 10 ps pulse serves as a pump in a parametric amplifier crystal, in which the signal detected by the telescope is seeded. The parametric crystal amplifies the signal only during the time gate of 10 ps. It should be remembered that in the case of "amplitude modulation" the sequence of electronic pulses that constitutes the useful signal of a particular channel has been "imprinted" onto the spectrum of a fs pulse. Therefore, one has to read and decode the original message by measuring, with a detector array, the spectrum of the gated, amplified signal, as shown in FIG. 9. Many of the components of FIG. 9 correspond to components of FIG. 2, as reflected with identical reference numerals. In FIG. 9, the non-linear crystal 46 is a parametric amplifier crystal. The Fourier transform of the amplified output signal has the same pattern as the original pulse signal at the transmitter. The fast camera 54 of FIG. 2 is replaced with a simple detector array in FIG. 9.

The delay element 49 of FIG. 9 is a layered structure, for instance a stack of glass plates of different lengths, such that beams in successive planes are delayed with respect to each other by the time separation between successive channels (typically 10 ps). The signal received by the telescope contains all channels. The channel selection is made by amplifying the relevant part of the main signal in a parametric amplifier. The energy to the amplification is provided by the synchronizing laser, which is of a shorter wavelength than the laser beam containing the modulation. In the case of amplitude modulation, detection is made simply by reading the spectrum of the light at each level with a detector array 54.

Phase modulation detection techniques may also be used in accordance with the invention. In the case of phase modulation, it is the relative delay between each spectral component that has to be detected. The product of a "line of delta functions" extracted from the reference laser is made with the signal to be detected, in a crystal of ZnSe in which a photocurrent proportional to the product of the reference times the received signal is produced. The particular signal amplified is a replica of the signal sent into the particular channel.

As in the case of amplitude modulation, the Fourier transform of the fs pulse sequence corresponding to an individual channel has to be derived. The phase of each spectral component has to be measured, which is a more difficult challenge than just measuring the amplitude. However, since digital signals are being processed, there are only two values of the phase to record. In the time domain, the phase of an individual frequency component corresponds to its delay, or time of arrival. Take, for example, 32-bit communication. At the emission, the spectrum of the 100 fs pulse has been divided into 32 spikes. The frequency spacing between adjacent spectral components is $\delta = 10^{13} \, s^{-1}/32 = 0.3 \, 10^{12} s^{-1}$.

Figure 10:
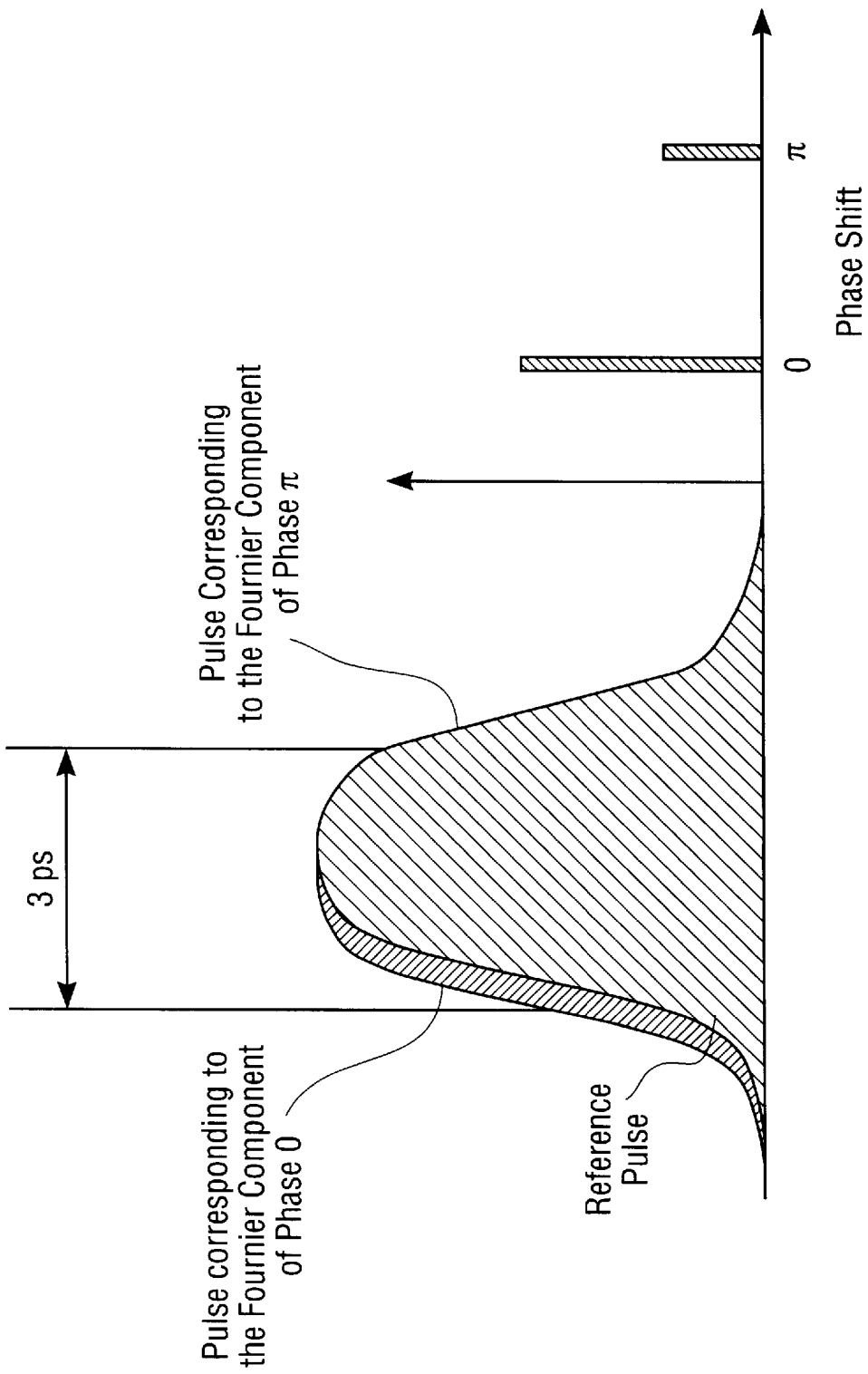
FIG. 10 illustrates a spectral component that is processed in accordance with an embodiment of the invention.

If a spectral component is given a phase shift of $\pi$, its time correspondent (which is a 3 ps pulse) will have a delay of one half wavelength. The most sensitive detection is to detect the product of the pulse corresponding to the spectral component with a 100 fs reference signal, positioning the reference pulse at the leading edge of the spectral component, as shown in FIG. 10. FIG. 10 illustrates one spectral component of the train of fs (ps) pulses that contain the signal plotted as a finction of time. Assume that the spectral component has been assigned the phase $\pi$. Its inverse Fourier transform is therefore delayed by one half wavelength. Next, a reference pulse is sent, timed to appear at some time during the leading edge of the signal. On the right, the result of the nonlinear correlation between the reference and either signal spectrum is shown. The contrast is maximum if the reference is chosen along the greatest slope of the signal.

The correlator has to be a sensitive detector, and at the same time nonlinear. Such a correlator has been designed based upon two-photon photoconductivity in ZnSe. The sample is 100 $\mu$m thick, and of high mobility (600 cm$^2$/volt-sec). A voltage close to breakdown voltage will be able to sweep the photoelectrons to one electrode, before recombination occurs. The light is sent normal to a thin edge (0.1 mm ×10 mm) of the crystal, focused by a linear array of microlenses. The light has a centimeter to penetrate and create carriers by two-photon absorption. The reference pulses and signal are sent collinear into the detector.

Figure 11:
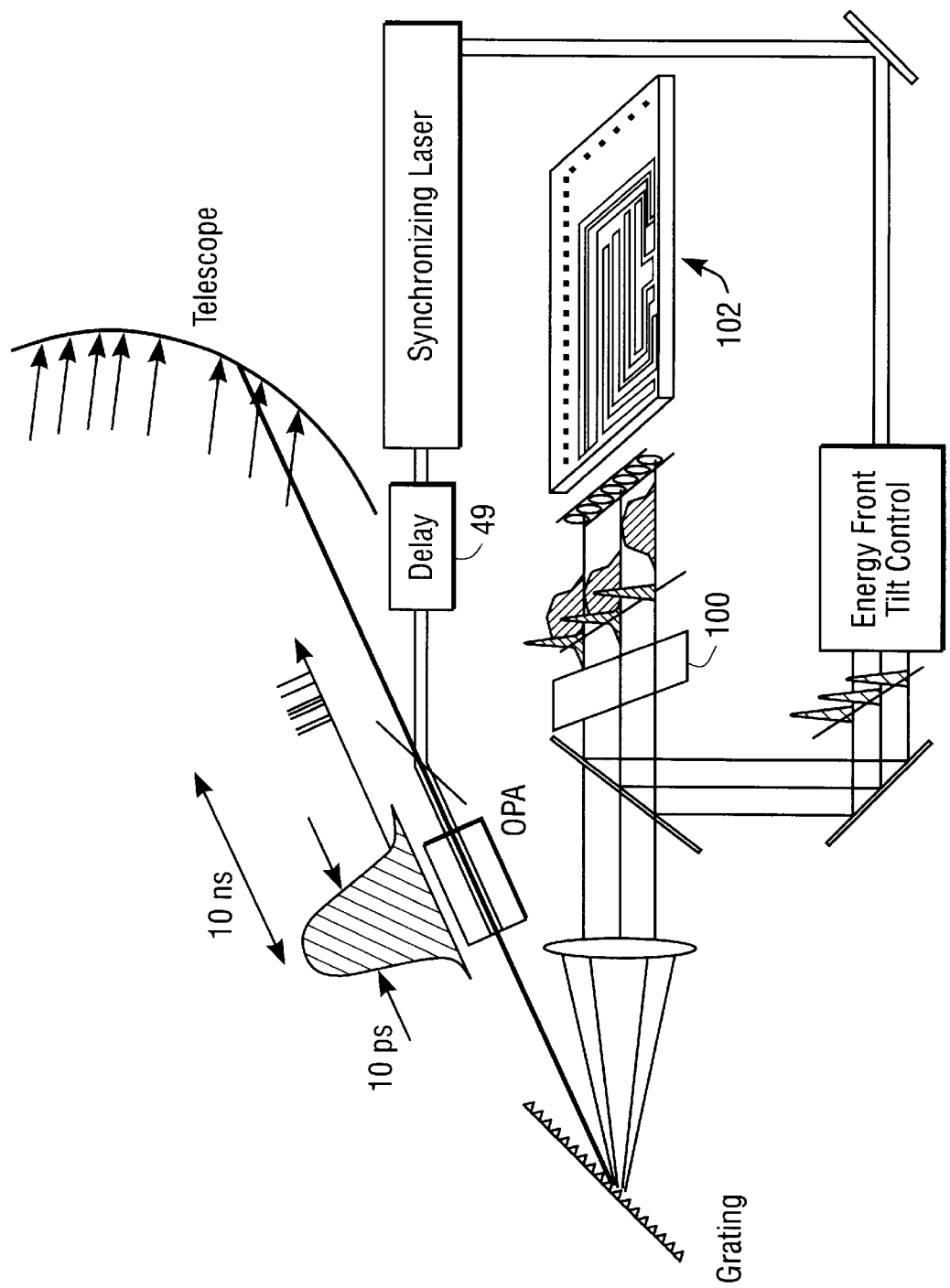
FIG. 11 illustrates a cross-correlation apparatus utilized in accordance with an embodiment of the invention.

The grating compressor and the reference delay must be designed such that the energy front of the reference pulses and the spectral component pulses (corresponding to zero phase) are parallel. The overall detection technique is shown in FIG. 11. In particular, FIG. 11 illustrates a detection cross-correlator 100 and an associated two-photon detector array 102. The two-levels of output of the array correspond to the two values of the spectral phase. A phase shift of a spectral component of the incoming signal implies that the corresponding time signal is delayed. A reference pulse is cross-correlated with the rising edge of each spectral component. The result of the cross-correlation is an indication as to whether the spectral component has been phase shifted or not.

Figure 12:
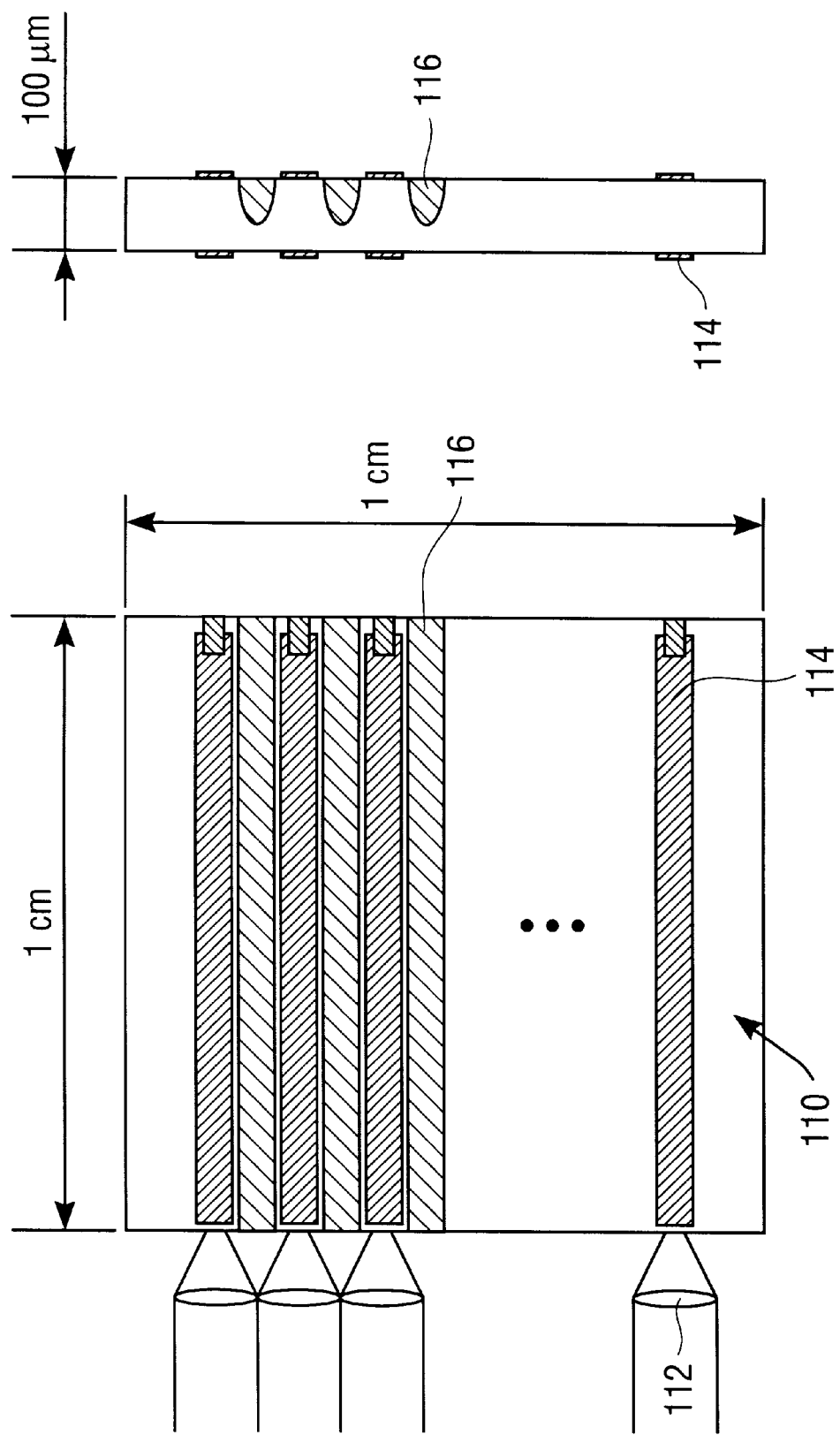
FIG. 12 illustrates a two-photon detector utilized in conjunction with the apparatus of FIG. 11.

The two-photon detector array 102 has been fabricated on a 100 micron thick sample of single crystal ZnSe, as shown in FIG. 12. Each spectral component is focused onto the edge face of the ZnSe crystal 110. That is, lenses 112 are used to focus the spectral components onto electrodes 114. The electrodes 114 are separated by etched trenches 116. The focusing is chosen such that the confocal parameter of the beam is within the crystal length. An electric field closest to the breakdown voltage is applied between each upper electrode and the corresponding bottom electrode, in order to "sweep away" the two-photon photocarriers.

Beams from each channel are focused into the waveguide detector by a lens array similar to that used at the modulation end. The two-photon induced photocurrent from each channel is preamplified and stored. Microlenses can be cut directly in the edge face of the ZnSe.

Figure 13:
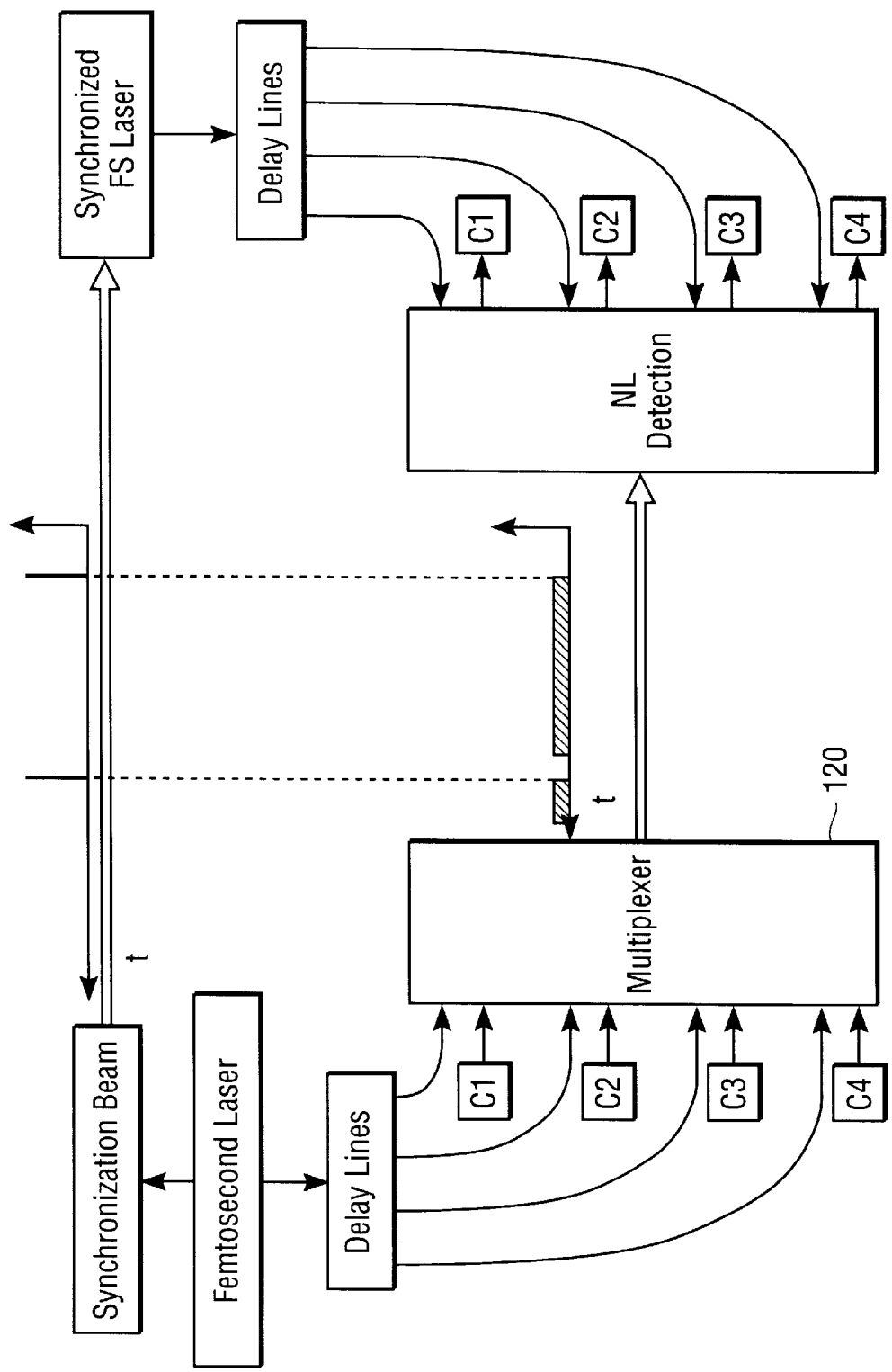
FIG. 13 illustrates a multiplexing apparatus utilized in accordance with an embodiment of the invention.

Attention presently turns to multiplexing operations performed in accordance with the invention. FIG. 13 illustrates the overall architecture of a femtosecond time-of-flight communication system in accordance with the invention. The synchronization beam, indicating with a short pulse the beginning of each string of fs signals, can be derived from the same femtosecond laser used to provide the fs pulses into each pulse shaper. Typically, a shorter wavelength is used for synchronization. The system of FIG. 13 assumes several channels with digital pulse coded modulation at 10 Ghz. A femtosecond laser is providing a train of pulses at, for example, 100 MHz. Each femtosecond pulse is split into a large number (as many as there are channels; up to 1,000 in this example) of pulses, and given an incremental delay of 10 ps. Each of these pulses is used to make a compressed version of the original word (spanning 10 ps instead of 10 ns). To this effect, the multiplexer consists of a stack of modulators of the type shown in FIG. 3 or FIG. 6. All the various signals are then recombined together into the beam to be emitted. The clock laser at 100 MHz is operated at two simultaneous wavelengths. The shorter wavelength train of pulses is sent directly through the same telescope as used for sending out the modulated signal to the receiver.

In the multiplexer 120 of FIG. 13, each of the mutually delayed pulses is combined with an element or word of the appropriate channel to produce a replica of the information (or data) contained in that channel, but compressed in a time span of a few picoseconds (less than 10). The information of each channel, compressed to less than 10 ps, is put into a temporal succession in the main beam to be sent for detection. When detected, the 10 ns between two successive pulses is divided into as many 10 ps channels as was sent from the emitter. The information contained in each 10 ps segment is thereafter decoded to reproduce the original electronic information that was contained in the channel.

The shorter wavelength train is used at the reception as an injection to the local oscillator laser at the reception. Its function is mainly that of a synchronizer pulse used to demultiplex the successive channels at the reception.

Figure 14:
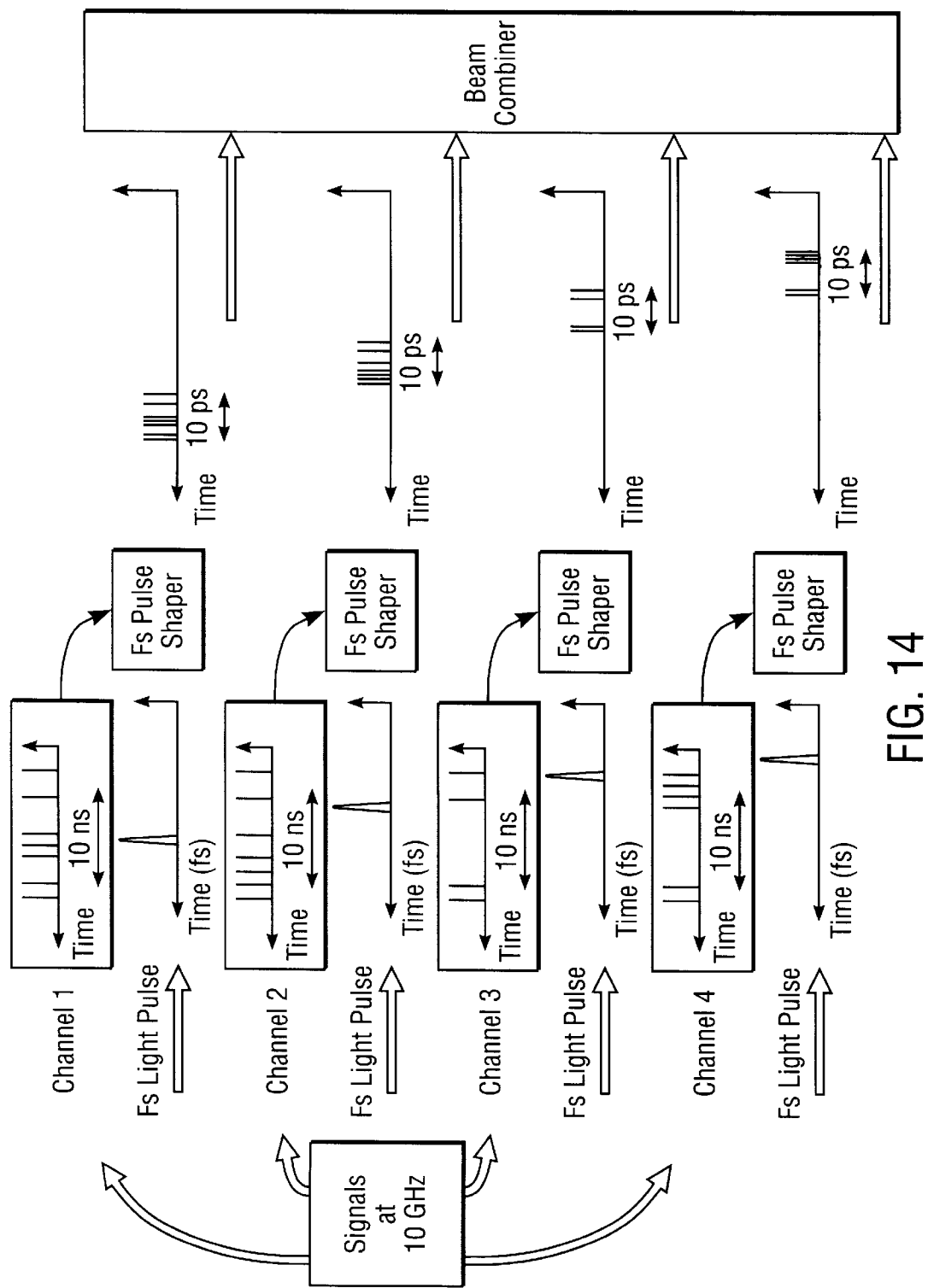
FIG. 14 illustrates the time combination of various channels into a single light beam in accordance with an embodiment of the invention.

FIG. 14 illustrates the combination of various channels into a single light beam. The compression of a nanosecond time sequence of pulses (the original "word" in each channel) into a fs pulse train is established using either the amplitude modulation or phase modulation techniques described above.

At the emitter, either in the amplitude or phase modulator mode, the LiNbO$_3$ modulators are stacked on top of each other, and the linear microlens arrays become 2-D lens arrays. The successive delays of the reference pulses that define the channel can be realized with "echelon" reflectors of the type described above.

The reception demultiplexing is the same tri-dimensional structure as the emission. In the case of phase modulation, the successive detector arrays made of 100 $\mu$m thick ZnSe plates are stacked on top of each other. An echelon reflector is used for the reference pulses used in the parametric amplifier and in the cross-correlation.

The foregoing description, for purposes of explanation, used specific nomenclature to provide a thorough understanding of the invention. Well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A laser communication system, comprising:
    a first laser to generate a laser signal with femtosecond pulses characterizing data to be transferred;
    a first grating to spectrally disperse said femtosecond pulses of said laser signal;
    an opto-electronic modulator to convert said femtosecond pulses of said laser signal into time modulated coded words characterizing said data to be transferred;
    a second grating to spectrally recombine said time modulated coded words of said laser signal; and
    a telescope to launch said laser signal;
    a receiving telescope to receive said laser signal;
    a second laser to generate a set of reference pulses;
    a cross-correlator to cross-correlate reference pulses from said second laser with selected spectral components of said laser signal to determine whether said selected spectral components have been phase shifted;
    a non-linear crystal to combine said set of reference pulses and said laser signal so as to create an output signal only when said laser signal and said reference pulses temporally coincide; and
    a detector to record said output signal.

2. The apparatus of claim 1 wherein said opto-electronic modulator is an amplitude modulator.

3. The apparatus of claim 2 wherein said amplitude modulator includes a plurality of waveguides formed in a waveguide substrate, each waveguide forming a portion of an interferometer to process a spectral component of said laser signal.

4. The apparatus of claim 3 further comprising lenses positioned on said waveguide substrate at the input and output of each waveguide of said plurality of waveguides.

5. The apparatus of claim 3 further comprising a plurality of waveguide substrates arranged in a stack.

6. The apparatus of claim 1 wherein said opto-electronic modulator is a phase modulator.

7. The apparatus of claim 6 wherein said phase modulator includes a plurality of waveguides formed in a waveguide substrate, each waveguide forming a portion of an interferometer to process a spectral component of said laser signal.

8. The apparatus of claim 7 further comprising lenses positioned on said waveguide substrate at the input and output of each waveguide of said plurality of waveguides.

9. The apparatus of claim 7 further comprising a plurality of waveguide substrates arranged in a stack.

10. The apparatus of claim 1 wherein said second laser is synchronized with said first laser by injection mode locking.

11. The apparatus of claim 1 wherein said non-linear crystal amplitude modulates said laser signal.

12. The apparatus of claim 1 wherein said first laser simultaneously generates said laser signal and a synchronization signal.

13. A method of laser-based data communications said method comprising the steps of:
    generating a laser signal with femtosecond pulses characterizing a data signal to be transferred;
    spectrally dispersing said femtosecond pulses of said laser signal;
    converting said femtosecond pulses of said laser signal into time modulated coded words characterizing said data signal to be transferred;
    spectrally recombining said time modulated coded words of said laser signal;
    launching said laser signal from a home location to a remote destination;
    receiving said laser signal at said remote destination;
    generating a set of reference pulses;
    cross-correlating reference pulses from said second laser with selected spectral components of said laser signal to determine whether said selected spectral components have been phase shifted;
    combining said set of reference pulses and said laser signal so as to create an output signal only when said laser signal and said reference pulses temporally coincide; and
    recording said output signal.

14. The method of claim 13 wherein said converting step includes the step of of amplitude modulating said femtosecond pulses of said laser signal.

15. The method of claim 14 wherein said converting step includes the step of processing spectral components of said laser signal in an interferometer.

16. The method of claim 13 wherein said converting step includes the step of phase modulating said femtosecond pulses of said laser signal.

17. The method of claim 16 wherein said converting step includes the step of processing spectral components of said laser signal in an interferometer.

18. The method of claim 13 further comprising the step of synchronizing a laser at said home location with a laser at said remote destination by injection mode locking.

19. The method of claim 13 wherein said combining step includes the step of amplitude modulating said laser signal.

20. The method of claim 13 wherein said generating step includes the step of simultaneously generating said laser signal and a synchronization signal.

* * * * *